United States Patent
Lu et al.

(10) Patent No.: US 10,564,735 B2
(45) Date of Patent: Feb. 18, 2020

(54) COMPUTER INPUT SYSTEM AND INPUT METHOD WITH FUNCTION OF DISTRIBUTING COMPUTATION

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Yuan-Jung Chang, New Taipei (TW)

(73) Assignees: DEXIN ELECTRONIC LTD., Dongguan, Guangdong (CN); DEXIN CORPORATION, New Taipei (TW)

(*) Notice: Subject to any disclaimer, the term of this patent is extended or adjusted under 35 U.S.C. 154(b) by 0 days.

(21) Appl. No.: 16/249,821

(22) Filed: Jan. 16, 2019

(65) Prior Publication Data
US 2019/0294266 A1 Sep. 26, 2019

Related U.S. Application Data

(60) Provisional application No. 62/646,405, filed on Mar. 22, 2018.

(51) Int. Cl.
*G06F 3/0354* (2013.01)

(52) U.S. Cl.
CPC .................. *G06F 3/03543* (2013.01)

(58) Field of Classification Search
None
See application file for complete search history.

(56) References Cited

U.S. PATENT DOCUMENTS

| | | | |
|---|---|---|---|
| 6,256,014 B1 * | 7/2001 | Thomas | G06F 3/023 345/157 |
| 2005/0190148 A1 * | 9/2005 | Fujita | G06F 3/023 345/156 |
| 2012/0154279 A1 * | 6/2012 | Yang | G06F 3/017 345/163 |

* cited by examiner

*Primary Examiner* — Nicholas J Lee
(74) *Attorney, Agent, or Firm* — Li & Cai Intellectual Property (USA) Office

(57) ABSTRACT

A computer input system with distributing computation function is provided. The computer input system includes a first electronic device, a second electronic device and a mouse. The computation executed by the mouse includes a first computation and a second computation. The mouse executes the first computation and transmits the second computation to the second electronic device, so that the second electronic device can execute the second computation.

10 Claims, 4 Drawing Sheets

COMPUTER INPUT SYSTEM AND INPUT METHOD WITH FUNCTION OF DISTRIBUTING COMPUTATION

CROSS-REFERENCE TO RELATED PATENT APPLICATION

This application claims the benefit of priority to prior application Ser. U.S. 62/646,405, filed on Mar. 22, 2018. The entire content of the above identified application is incorporated herein by reference.

FIELD OF THE DISCLOSURE

The present disclosure relates to an input system, and more particularly to a computer input system and method with function of distributing computation.

BACKGROUND OF THE DISCLOSURE

With the advancement of technology, functions of computer input systems, such as an input system of a mouse or a keyboard, are becoming more diverse. However, a large amount of computation must be made due to the variety of functions; for example, it may cause the screen to pause or the sound effect to be intermittent. Therefore, how a computer input system that can distribute the amount of computation can be designed is an important issue in the art.

SUMMARY OF THE DISCLOSURE

An exemplary embodiment of the present disclosure provides a computer input system with the function of distributing computation including a first electronic device, a second electronic device, and a mouse. The mouse is selectively connected to the first electronic device or the second electronic device. When being connected to the first electronic device, the mouse executes a first computation related to an operation of the first electronic device according to a user's operation. When executing a second computation, the mouse outputs the second computation to the second electronic device and receives an execution result of the second electronic device that executed the second computation. Functional operations corresponding to the first computation and the second computation are different from each other.

An exemplary embodiment of the present disclosure provides a computer input method with the function of distributing computation applied to a system, which includes a first electronic device, a second electronic device, and a mouse. The computer input method includes: connecting the mouse to the first electronic device; executing, by the mouse, a first computation related to an operation of the first electronic device according to a user's operation; outputting, by the mouse, a second computation to the second electronic device according to a user's operation; and receiving, by the mouse, an execution result of the second electronic device that executed the second computation. Functional operations corresponding to the first computation and the second computation are different from each other.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
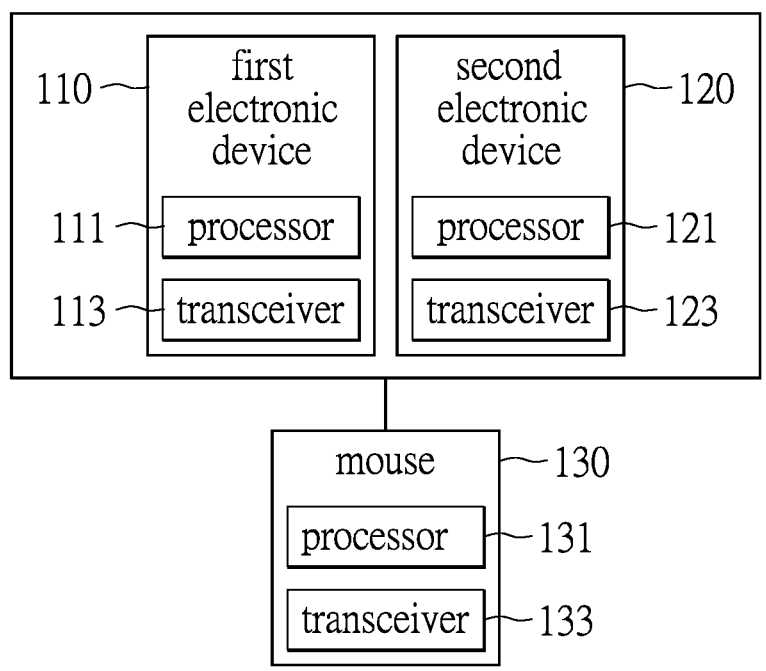
FIG. 1 is a block diagram showing a computer input system with the function of distributing computation depicted in accordance with an exemplary embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1. FIG. 1 is a block diagram showing a computer input system 100 with the function of distributing computation depicted in accordance with an exemplary embodiment of the present disclosure. The computer input system includes a plurality of electronic devices.

The computer input system 100 includes a first electronic device 110, a second electronic device 120 and a mouse 130. More specifically, the first electronic device 110 includes a processor 111 and a transceiver 113. The second electronic device 120 includes a processor 121 and a transceiver 123. The mouse 130 includes a processor 131 and a transceiver 133. The first electronic device 110 and the second electronic device 130 can be, for example, a notebook, a tablet, a desktop computer, or an integrated full function (All-in-One) computer, etc., and is not limited herein.

In the embodiment, the mouse 130 can be selectively connected to the first electronic device 110 or the second electronic device 120. In addition, the mouse 130 can be connected to the first electronic device 110 or the second electronic device 120 in a wired or a wireless manner. For example, the mouse 130 can be connected to the transceiver 113 of the first electronic device 110 through the transceiver 133 in a wired or wireless manner. Similarly, the mouse 130 connected to the transceiver 123 of the second electronic device 120 through the transceiver 133 can be a wired or wireless connection. That is to say, the transceiver 133 of the mouse 130 can be a wired transceiver or a wireless transceiver, and the wireless transceiver can be, for example, a Bluetooth module or a wireless radio frequency communication module. In addition, it should be noted that when the mouse is connected to the first electronic device 110, a series number of the mouse 130 and a series number of the first electronic device 110 can represent a first group of identification numbers. When the mouse 130 is connected to the second electronic device 120, the series number of the mouse 130 and a series number of the second electronic device 120 can represent a second group of identification numbers. The above-mentioned series numbers can be a product code or an identification code of a device used for identification and differentiation, and the first group of identification numbers and the second group of identification numbers are different from each other and unique, and can be identified accordingly by other devices to obtain a connection status of the mouse 130 and the electronic devices.

In an embodiment, a computation that needs to be processed by the mouse 130 can be selectively shared by devices other than the mouse 130 for execution, and the mouse 130 can receive an execution result from other devices executing the shared computation. For example, the computation executed by the processor 131 of the mouse 130 can include, for example, a first computation and a second computation. The first computation is, for example, a function related to a most basic cursor detection of the mouse 130 or an input interface operation of the mouse, the input interface operation of the mouse 130 being, for example, an operation of the mouse buttons or the mouse wheels herein. The second computation is, for example, additional functional operations of the mouse, the additional functional operations being associated with an image processing, a data analysis and statistics, a macro instruction control, a speech recognition, a data access or a human-machine interaction, but the disclosure is not limited thereto. The functional operations corresponding to the second computation and the first computation in the embodiment are different from each other.

More specifically, the mouse 130 is used to execute the first computation associated with an operation of the first electronic device 110 according to a user's operation when connected to the first electronic device 110. For example, the mouse 130 is used to control operations related to the cursor movement or the cursor click displayed on the first electronic device 110. If the mouse 130 further executes the second computation at this moment, a lot of software and hardware resources of the mouse 130 or the first electronic device 110 may be consumed, and the smoothness of the basic cursor movement or the cursor click operation may be affected. Therefore, in an embodiment of the present disclosure, the second computation is not directly used by the mouse 130 but shared and executed by the second electronic device 120 or other devices. The mouse 130 may further manage an execution flow of the second computation and receive the execution result from executing the second computation. In other words, through the above-mentioned method of sharing the computation to different devices, mouse 130 can execute different functional operations and still maintain a certain level of the smoothness and convenience of operation.

In an embodiment, the processor 131 of the mouse 130 is used to calculate and distribute which computation can be processed by the mouse 130 itself, or which can be processed by the processor 121 of the second electronic device 120, or other electronic devices. For example, a first proportion of the total computation which needs to be calculated can be executed by the processor 111 of the mouse 130, and the remaining second proportion of the total computation which needs to be calculated can be executed by the processor 121 of the second electronic device 120, but the distribution proportion in the present disclosure is not limited herein. For example, the above-mentioned first proportion is designed so as to not affect the regular operation of the mouse 130. The first proportion can be the first computation, and can be applied to, for example, a cursor control, document movement, or the cursor click, but the disclosure is not limited herein. The second proportion can be the second computation, and the second computation can be applied to, for example, an image processing, a data analysis and statistics, a macro instruction control, a speech recognition, a data access or a human-machine interaction, but the disclosure is not limited herein.

In an embodiment, the mouse 130 may further be provided with additional functional operations, such as one or any combination of a memory, a touch panel, a speech input device and an image recognition device. The memory provided in the mouse 130 can be used to store data or instructions required by the individual, such as shortcut commands or macro commands related to the operation of the mouse 130 or to the execution of an application. The touch panel provided in the mouse 130 can provide operations related to handwriting recognition input or touch input. The speech input device provided by the mouse 130 is, for example, a microphone, and is operated for speech input operation. The image recognition device provided in the mouse 130 is used to perform an image input recognition. The additional functional operations of the mouse described herein are merely illustrative and do not limit the disclosure.

Therefore, from the above description, the computation executed by the mouse 130 of the present disclosure can be flexibly distributed to other electronic devices to reduce the processing load of the mouse itself.

In an embodiment, when the mouse 130 is connected to the electronic device 110 and the mouse 130 obtains a touch input operation through the touch panel, the mouse 130 distributes a computation for the recognition of the touch input operation to the second electronic device 120 for execution. An agent application pre-installed in the second electronic device 120 can be connected to the mouse 130, and after receiving the computation for the touch input operation transmitted by the mouse 130, the hardware resources of the second electronic device 120 can be used to recognize the touch input operation, and the recognized execution result is transmitted back to the mouse 130, so that the mouse 130 can execute a touch input operation on the first electronic device 110 or the mouse 130 itself according to the execution result.

In an embodiment, when the mouse 130 is connected to the electronic device 110 and the mouse 130 obtains a speech input operation through the speech input device, the mouse 130 distributes a computation for recognition of the speech input operation to the second electronic device 120 for execution. An agent application pre-installed in the second electronic device 120 can be connected to the mouse 130, and after receiving the computation of the speech input operation transmitted by the mouse 130, the hardware resources of the second electronic device 120 can be used to recognize the speech input operation, and the recognized execution result is transmitted back to the mouse 130, so that the mouse 130 can execute a speech input operation on the first electronic device 110 or the mouse 130 itself according to the execution result.

In an embodiment, when the mouse 130 is connected to the electronic device 110 and the mouse 130 obtains an image input operation through the image recognition device, the mouse 130 distributes a computation for recognition of the image input operation to the second electronic device 120 for execution. An agent application pre-installed in the second electronic device 120 can be connected to the mouse 130, and after receiving the computation of the image input operation transmitted by the mouse 130, the hardware resources of the second electronic device 120 can be used to recognize the image input operation, and the recognized execution result is transmitted back to the mouse 130, so that the mouse 130 can execute a image input operation on the first electronic device 110 or the mouse 130 itself according to the execution result.

In addition, it should be noted that the transmission between the mouse 130 and the second electronic device 120 is through a wireless manner, that is, the mouse 130 can wirelessly output a related data required to be shared to the second electronic device 120, and the mouse 130 can receive the execution result returned by the second electronic device 120 through the wireless manner.

Furthermore, when the mouse 130 is wired with the first electronic device 110, the mouse outputs the second computation to the second electronic device 120 through the wireless transmission channel, which does not affect an original connection between the mouse 130 and the first electronic device 110.

When the mouse 130 is wirelessly connected to the first electronic device 110 and outputs the second computation to the second electronic device 120, the mouse 130 stops connecting to the first electronic device 110 and wirelessly connects to the second electronic device 120. After the mouse 130 outputs the second computation to the second electronic device 120, the mouse 130 stops wirelessly connecting to the second electronic device 120 after receiving the execution result of the second electronic device 120 and wirelessly reconnects to the first electronic device 110. In addition, in an embodiment of the present disclosure, after the mouse 130 transmits the second computation to the second electronic device 120, the mouse 130 stops wirelessly connecting to the second electronic device 120 and wirelessly reconnects to the first electronic device 110, then the mouse 130 stops wirelessly connecting with the first electronic device 110 and wirelessly connects to the second electronic device 120 at every predetermined interval, and determines whether the second electronic device 120 has finished with the second computation. If the second electronic device 120 has finished with the second computation, the mouse 130 directly receives the execution result. If the second electronic device 120 has not finished with the second computation, the mouse 130 stops wirelessly connecting to the second electronic device 120 and wirelessly connects to the first electronic device 110. The above manner is repeatedly executed until the mouse 130 receives the execution result of the second electronic device 120.

Figure 2:
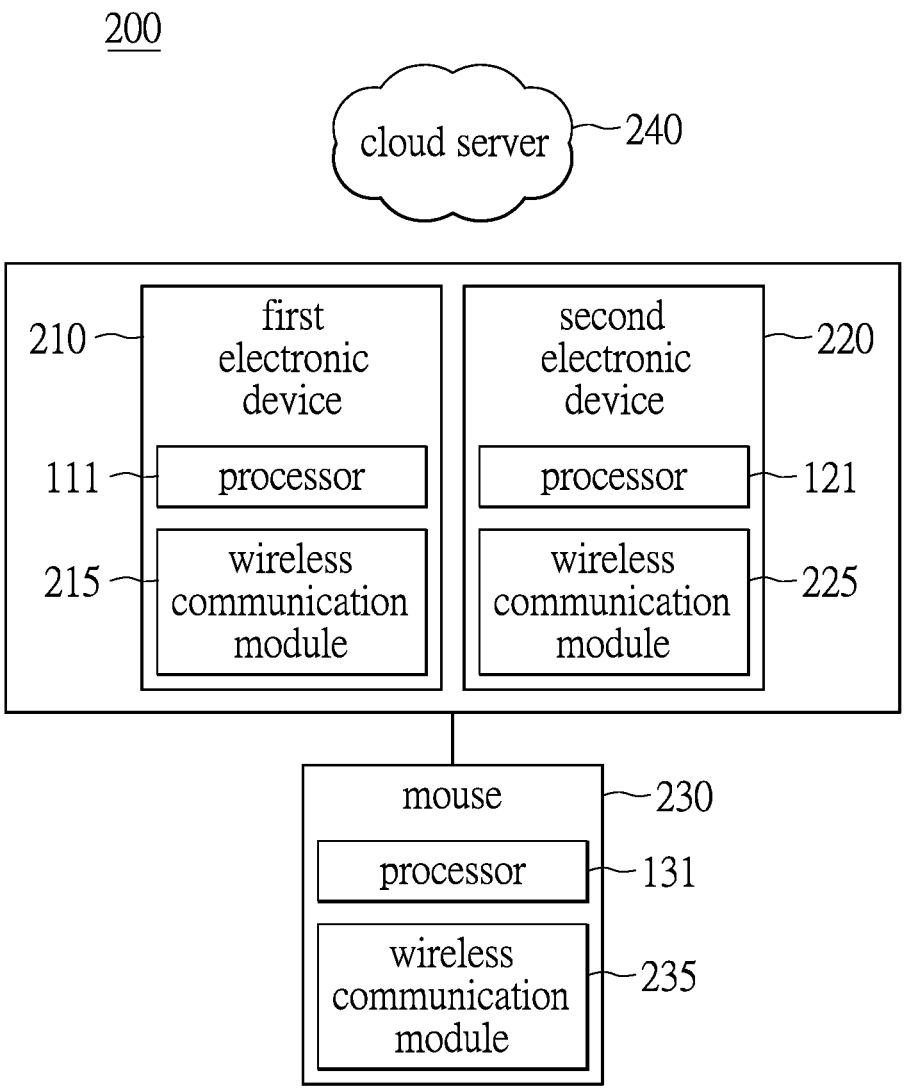
FIG. 2 is a block diagram showing a computer input system with the function of distributing computation depicted in accordance with another exemplary embodiment of the present disclosure.

Reference is made to FIG. 2. FIG. 2 is a block diagram showing a computer input system with the function of distributing computation depicted in accordance with another exemplary embodiment of the present disclosure. The computer input system 200 includes a first electronic device 210, a second electronic device 220, a mouse 230 and a cloud server 240. More specifically, the first electronic device 210 includes a processor 111 and a wireless communication module 215. The second electronic device 220 includes a processor 121 and a wireless communication module 225. The mouse 230 includes a processor 131 and a wireless communication module 235. The main operation manner of the computer input system 200 is substantially the same as that of the computer input system 100 described above, and will not be described herein. Next, differences between the computer input systems 100, 200 will be described in the following.

Functional operations of the wireless communication modules 215, 225, 235 illustrated in FIG. 2 are the same as the transceiver in FIG. 1, but the wireless communication modules 215, 225, 235 of this embodiment are, for example, WIFI communication modules or mobile communication modules providing wireless network communication functions with faster transmission speed and longer transmission distance. The cloud server 240 disposed in a network environment can be used to log in the first electronic device 210 or the second electronic device 220, and the cloud server 240 can provide data processing functions of a cloud storage and a cloud computing.

In an embodiment of the present disclosure, when the mouse 130 outputs the second computation to the second electronic device 220, the agent application of the second electronic device 220 outputs the second computation to the cloud server 240, the cloud server 240 then processes the second computation. When the cloud server 240 finishes with the second computation and transmits the execution result to the second electronic device 240, the second electronic device 240 receives the execution result and transmits the execution result to the mouse 230.

In addition, it should be noted that when the second electronic device 220 outputs the second computation to the cloud server 240, the related identity information is transmitted together, the identity information being the second group of identification numbers when the mouse 230 is connected to the second electronic device 220. The second group of identification numbers includes the series number of the mouse 230 and the series number of the second electronic device 210, so that the cloud server 240 obtains the second computation of the mouse 230 which needs to be shared according to the second group of identification numbers, and this second computation is provided by the second electronic device 220.

In an embodiment, the computing requirement of the second computation received by the cloud server 240 may allow a network storage space provided for the mouse 230 to access the data. For example, a user may store shortcut instructions or macro instructions related to operation of the mouse 230 in the storage space of the cloud server 240. Therefore, when the mouse 230 needs to use these shortcut instructions or macro instructions during the operation process, the mouse 230 can output a second computation associated with the cloud server 240 accessing the data request, and then the mouse 230 can obtain the related shortcut instructions or macro instructions through the second electronic device 220. The mouse 230 can perform subsequent control operations on the connected first electronic device 210 according to the instructions.

Figure 3:
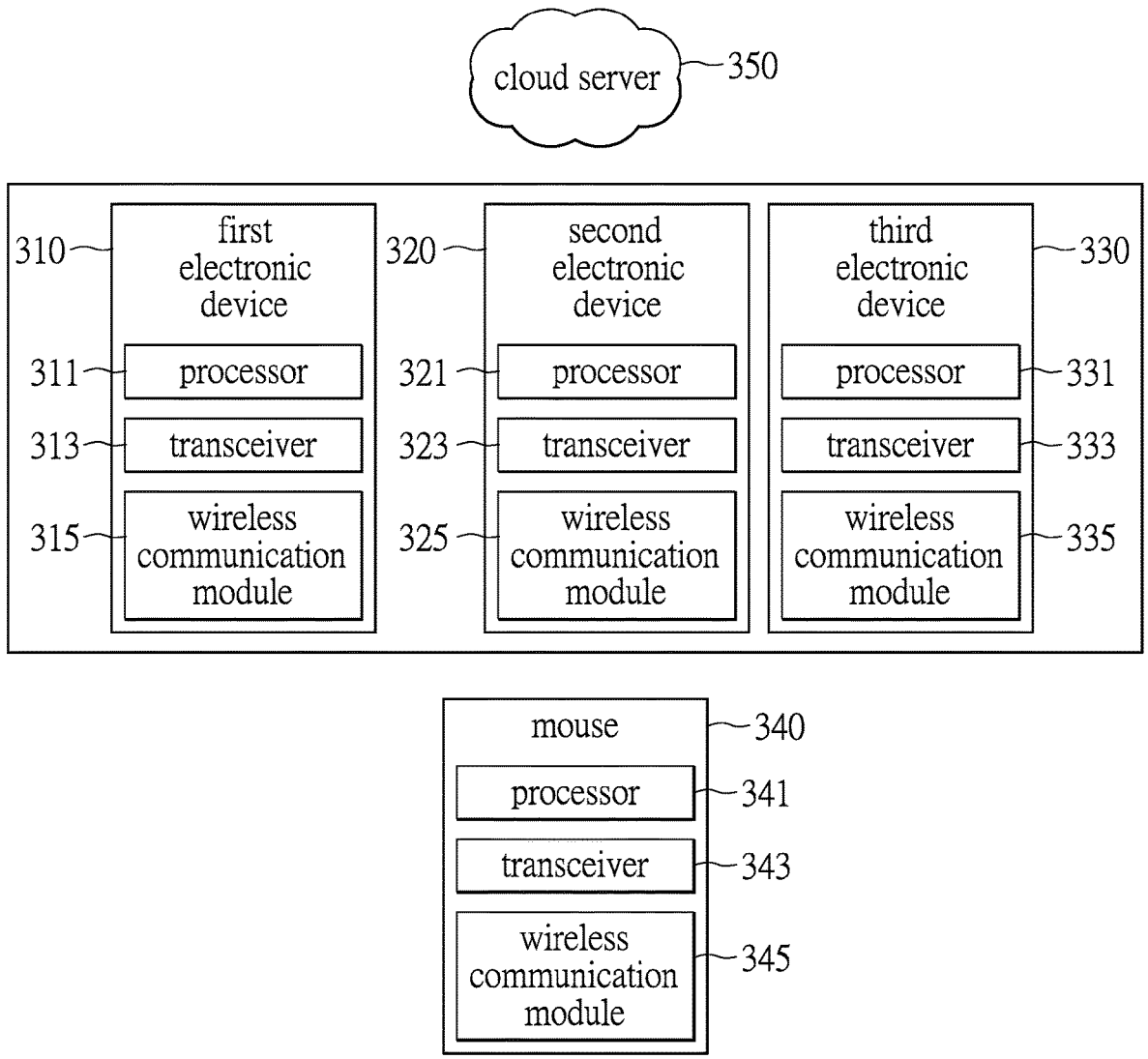
FIG. 3 is a block diagram showing a computer input system with the function of distributing computation depicted in accordance with another exemplary embodiment of the present disclosure.

Reference is made to FIG. 3. FIG. 3 is a block diagram showing a computer input system with the function of distributing computation depicted in accordance with another exemplary embodiment of the present disclosure.

The computer input system 300 includes a first electronic device 310, a second electronic device 320, a third electronic device 330, a mouse 340 and a cloud server 350. More specifically, the first electronic device 310 includes a processor 311, a transceiver 313 and a wireless communication module 315. The second electronic device 320 includes a processor 321, a transceiver 323 and a wireless communication module 325. The third electronic device 330 includes a processor 331, a transceiver 333 and a wireless communication module 335. The mouse 340 includes a processor 341, a transceiver 343 and a wireless communication module 345. The main operation manner of the computer input system 300 is substantially the same as that of the computer input systems 100 and 200 described above, and will not be described herein. Next, differences between the computer input system 300 and the computer input systems 100, 200 will be described in the following.

In an embodiment, the computation that the mouse 340 needs to perform can be performed simultaneously or respectively by a plurality of electronic devices. In this embodiment, there are three electronic devices in total, but the present disclosure is not limited by the number of electronic devices. The transceiver 343 of the mouse 340 can communicate with the transceiver 313 of the first electronic device 310, the transceiver 323 of the second electronic device 320, and the transceiver 333 of the third electronic device 330. The wireless communication module 345 of the mouse 340 can communicate with the wireless communication module 315 of the first electronic device 310, the wireless communication module 325 of the second electronic device 320, and the wireless communication module 335 of the third electronic device 330. In an embodiment, the mouse 340 can connect with the first electronic device 310 through the transceiver 343 and connect to the second electronic device 320 or the third electronic device 330 through the wireless communication module 345, so that the mouse 340 does not disconnect with the first electronic device 310 when distributing the second computation to the second electronic device 320 or the third electronic device 330 to process.

The advantage of providing a plurality of electronic devices in this embodiment is that when there are many quantities or types of the second computation that need to be processed, the second computation can be distributed to a plurality of electronic devices for processing. For example, the mouse 340 can transmit the analysis and statistics function to the processor 321 of the second electronic device 320 for execution, transmit the image processing function to the processor 331 of the third electronic device 330 for execution, transmit the speech recognition function to a processor of a fourth electronic device (not shown in figure) for execution, transmit the human-machine interaction function to a processor of a fifth electronic device (not shown in figure) for execution, and transmit the data access operation to the cloud server 350 for processing.

Figure 4:
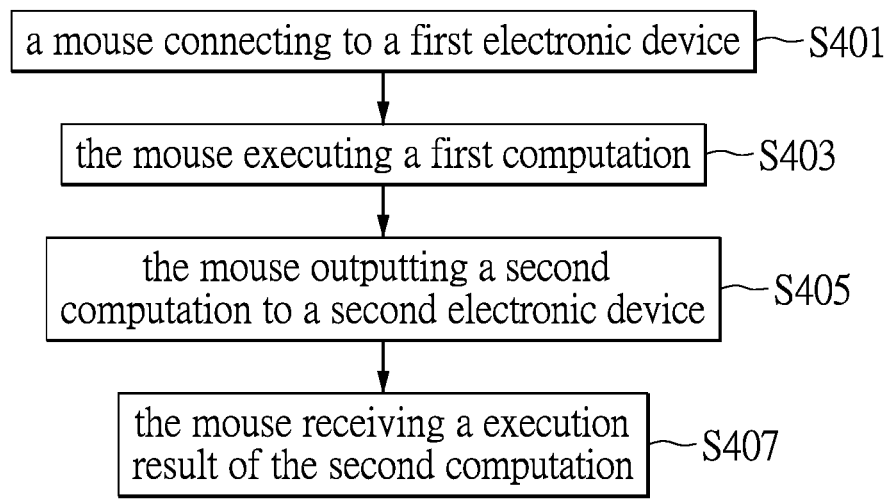
FIG. 4 is a flow chart showing a computer input method with the function of distributing computation depicted in accordance with an exemplary embodiment of the present disclosure.

Reference is made to FIG. 1 and FIG. 4. FIG. 4 is a flow chart showing a computer input method with the function of distributing computation depicted in accordance with an exemplary embodiment of the present disclosure. The computer input method is applied to the computer input system with distributing computation function. The computer input system can be, for example, one of or a combination of the above-mentioned computer input systems, and the computer input system of FIG. 1 is an example to describe the flow chart of FIG. 4.

The computer input method is applied to the computer input system 100 with distributing computation function. In step S401, the mouse 130 is connected to the first electronic device 110, that is, the user executes a related input operation on the first electronic device 110 through the mouse 130.

In step S403, the mouse 130 executes the first computation. In this step, the mouse executes the first computation related to the operation of the first electronic device 110 according to a user's operation. For example, the first computation may be a related input operation of the cursor input or the cursor click on the first electronic device 110, and these operations may be regarded by the mouse 130 as a first computation that can be directly executed.

In step S405, the mouse 130 outputs the second computation to the second electronic device 120. In this step, when the user's operation on the mouse 130 is not the first computation described above, the computation required for these input operations is regarded as the second computation, that is, the second computation is not directly executed by the mouse 130 itself. Instead, the second computation is shared by the mouse 130 to the processor 121 of the second electronic device 120 for execution.

In step S407, the mouse 130 receives the execution result of the second computation. In this step, the second computation performed by the second electronic device 120 returns to the mouse 130, and the mouse 130 can operate correspondingly according to the execution result.

In summary, a computer input system with distributing computation function including a mouse, a first electronic device and a second electronic device is provided. When the mouse needs to process a large amount of computation, in order to reduce the processing load of the mouse, the mouse can distribute the computation into a first computation and a second computation. The mouse only processes the first computation, and the second computation originally intended for processing by the mouse is shared to the second electronic device for execution. In other words, the second computation originally intended for execution by the mouse is executed instead by an electronic device or a cloud server other than the mouse, which can effectively reduce the computation of the mouse and accelerate operational efficiency of the processor of the mouse. This can also ensure that the smoothness of the mouse will not be affected when connected to the first electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A computer input system with distributing computation function, comprising:
   a first electronic device;
   a second electronic device; and
   a mouse selectively connecting to the first electronic device or the second electronic device;
   wherein when the mouse is connected to the first electronic device, the mouse executes a first computation related to an operation of the first electronic device according to a user's operation; when the mouse executes a second computation, the mouse outputs the second computation to the second electronic device and receives an execution result from the second electronic device that executed the second computation; wherein functional operations corresponding to the first computation and the second computation are different from each other.

2. The system according to claim 1, wherein when the mouse is connected to the first electronic device in a wired manner, the mouse outputs the second computation to the second electronic device in a wireless manner.

3. The system according to claim 1, wherein when the mouse is wirelessly connected with the first electronic device and outputs the second computation to the second electronic device, the mouse stops connecting to the first electronic device and wirelessly connects with the second electronic device; after the mouse outputs the second computation to the second electronic device, the mouse stops wirelessly connecting with the second electronic device after receiving the execution result of the second electronic device and wirelessly reconnects to the first electronic device.

4. The system according to claim 1, wherein when the mouse is wirelessly connected with the first electronic device and outputs the second computation to the second electronic device, the mouse stops wirelessly connecting with the first electronic device and wirelessly connects to the second electronic device; after the mouse outputs the second computation to the second electronic device, the mouse stops wirelessly connecting with the second electronic device and wirelessly reconnects to the first electronic device, then the mouse stops wirelessly connecting with the first electronic device and wirelessly connects with the second electronic device at every predetermined interval, and determines whether the second electronic device has finished with the second computation; in the affirmative, the mouse directly receives the execution result.

5. The system according to claim 1, wherein when the second electronic device receives the second computation, the second electronic device outputs the second computation to a cloud server, the cloud server then processes the second computation; when the cloud server finishes with the second computation, the cloud server then transmits the execution result to the second electronic device.

6. A computer input method with distributing computation function, applied to a system with distributing computation function including a first electronic device, a second electronic device, and a mouse, the method comprising:
   the mouse connecting to the first electronic device;
   executing, by the mouse, a first computation related to an operation of the first electronic device according to a user's operation;
   outputting, by the mouse, the second computation to the second electronic device according to a user's operation; and
   receiving, by the mouse, an execution result from the second electronic device executing the second computation;
   wherein functional operations corresponding to the first computation and the second computation are different from each other.

7. The method according to claim 6, wherein when the mouse is connected to the first electronic device in a wired manner, the mouse outputs the second computation to the second electronic device in a wireless manner.

8. The method according to claim 6, wherein when the mouse is wirelessly connected with the first electronic device and outputs the second computation to the second electronic device, the mouse stops connecting to the first electronic device and wirelessly connects with the second electronic device; after the mouse outputs the second computation to the second electronic device, the mouse stops wirelessly connecting with the second electronic device after receiving the execution result of the second electronic device and wirelessly reconnects with the first electronic device.

9. The method according to claim 6, wherein when the mouse is wirelessly connected with the first electronic device and outputs the second computation to the second electronic device, the mouse stops wirelessly connecting with the first electronic device and wirelessly connects with the second electronic device; after the mouse outputs the second computation to the second electronic device, the mouse stops wirelessly connecting with the second electronic device and wirelessly reconnects to the first electronic device, then the mouse stops wirelessly connecting with the first electronic device and wirelessly connects to the second electronic device at every predetermined interval, and determines whether the second electronic device has finished with the second computation; in the affirmative, the mouse directly receives the execution result.

10. The method according to claim 6, wherein when the second electronic device receives the second computation, the second electronic device outputs the second computation to a cloud server, the cloud server then processes the second computation; when the cloud server finishes with the second computation, the cloud server then transmits the execution result to the second electronic device.

* * * * *